(12) United States Patent
Pitt et al.

(10) Patent No.: US 8,320,638 B2
(45) Date of Patent: Nov. 27, 2012

(54) ANONYMOUS ASSOCIATION SYSTEM UTILIZING BIOMETRICS

(76) Inventors: Alan M. Pitt, Phoenix, AZ (US); Shahram Partovi, Phoenix, AZ (US)

( * ) Notice: Subject to any disclaimer, the term of this patent is extended or adjusted under 35 U.S.C. 154(b) by 1175 days.

(21) Appl. No.: 12/081,070

(22) Filed: Apr. 10, 2008

(65) Prior Publication Data

US 2010/0321156 A1 Dec. 23, 2010

(51) Int. Cl.
*G06F 7/04* (2006.01)
(52) U.S. Cl. ........................... 382/115; 340/5.82
(58) Field of Classification Search ............ 382/100, 382/115, 116; 340/5.82
See application file for complete search history.

(56) References Cited

U.S. PATENT DOCUMENTS

| | | | |
|---|---|---|---|
| 5,930,804 A | 7/1999 | Yu et al. | |
| 6,826,537 B1 | 11/2004 | Wood et al. | |
| 6,851,054 B2 * | 2/2005 | Wheeler et al. | 713/176 |
| 7,152,045 B2 | 12/2006 | Hoffman | |
| 7,209,886 B2 | 4/2007 | Kimmel | |
| 2003/0065626 A1 | 4/2003 | Allen | |
| 2003/0088441 A1 * | 5/2003 | McNerney | 705/3 |
| 2004/0122709 A1 * | 6/2004 | Avinash et al. | 705/2 |
| 2005/0125258 A1 | 6/2005 | Yellin et al. | |
| 2005/0278197 A1 | 12/2005 | Podczerwinski et al. | |
| 2006/0026043 A1 | 2/2006 | Schneider et al. | |
| 2006/0293925 A1 | 12/2006 | Flom | |
| 2007/0027715 A1 * | 2/2007 | Gropper et al. | 705/2 |
| 2007/0055552 A1 * | 3/2007 | St. Clair et al. | 705/3 |
| 2007/0258626 A1 | 11/2007 | Reiner | |
| 2007/0279187 A1 | 12/2007 | Hekmatpour et al. | |

FOREIGN PATENT DOCUMENTS

| | | |
|---|---|---|
| JP | 2005/100454 | 4/2005 |
| JP | 2006/195669 | 7/2006 |

OTHER PUBLICATIONS

Authentify. "Two-Factor Authentication Employing Existing Infrastructures.", Feb. 2006.
Cavoukian et al. "Biometric Encryption: A Positive-Sum Technology that Achieves Strong Authentication, Security, and Privacy.", Mar. 2007.
eMedicalFiles IntelliFinger Product Description, Jan. 2007.
Krawczyk, Stephen. "Securing Electronic Medical Records using Biometric Authentication.", Jul. 2005.
Scott, Mike. "Fingers Point Toward Biometrics.", Aug. 2004.
TASCET Identity Network. "Registered Patient Number.", Feb. 2008.

* cited by examiner

*Primary Examiner* — Stephen R Koziol
(74) *Attorney, Agent, or Firm* — Kramer & Amado P.C.

(57) ABSTRACT

Various exemplary embodiments are a device and a related method for interaction with an anonymous database system, the device including: a biometric input; a communicator configured to retrieve a key stored in a first enrollment process, retrieve an institution identifier and a user identifier stored in a second enrollment process, and retrieve user data from an institution database corresponding to the institution identifier; and a display that displays the retrieved user data. Furthermore, various exemplary embodiments are a system and related method including: a plurality of biometric nodes in communication with one another, each of the plurality of biometric nodes comprising a biometric input; at least one central database in communication with the plurality of biometric nodes; and a plurality of institution databases in communication with the plurality of biometric nodes.

15 Claims, 11 Drawing Sheets

US 8,320,638 B2

ANONYMOUS ASSOCIATION SYSTEM UTILIZING BIOMETRICS

BACKGROUND OF THE INVENTION

1. Field of the Invention

This invention relates generally to a device and related systems and methods for anonymously storing and accessing data utilizing biometrics.

2. Description of Related Art

Identity management systems typically serve two fundamental purposes, authentication and authorization. Authentication refers to the process used to verify a person's identity. In other words, verifying that a person is who they claim to be. Authorization, on the other hand, refers to the process of establishing access privileges granted to the authenticated individual. Authentication and authorization form the cornerstones of traditional identity management.

In data intensive industries, such as banking, the association of data to an authenticated individual is of enormous importance. Consider, for example, an individual who desires to deposit a paycheck using an automated teller machine (ATM). In this situation, it is critical to the bank and the individual that the deposit be properly routed to the account associated with the individual. The banking industry presently utilizes a two-factor authentication system to verify the identity of the individual making the deposit. More specifically, in order to be properly authenticated, the individual must present an ATM card and a personalized secret code.

Having confidently verified the individual, the financial institution and the individual are reassured that funds are transferred to the correct account belonging to the authenticated individual. In addition to authentication, however, the financial institution must verify that the individual is authorized to conduct a transaction. More specifically, although the individual is verified to be the person he or she claims to be, the institution must make sure that the specific transaction to be conducted is allowed. For example, the individual would have to be authorized to make a withdrawal from an account. As another example, the bank may place a predetermined cap on withdrawals, such that the individual is not authorized to make a withdrawal from the account greater than the cap.

Authentication and authorization play a pivotal role in everyday life. From conducting financial transactions to logging into a computer network, authentication and authorization play a dual and intertwined role central to identity management in data intensive industries. There are, however, inherent problems with the systems currently used to implement authentication and authorization.

Classic database models used for authentication and authorization utilize a spoke and hub data arrangement, in which the individual identity rests at the center with associated ancillary data linked to that individual identity. Consequently, the relationships among ancillary or spoke-level data are managed via the central or hub-level individual identity. While occasional relationships among ancillary or spoke level data may exist or be created, these relationships remain localized. Therefore, in order to make the data stored at the ancillary or spoke level useful, it must be combined with data via the central or hub-level database. More particularly, the central or hub-level database contains information identifying individuals used to enable combination of data from multiple localized databases. Thus, successfully combining ancillary data depends on the ability to uniquely identify the individual at the center of the hub.

The requirement of combining data from multiple ancillary data sources is illustrated in the retrieval of credit scores. While an individual bank may be able to associate various accounts held by a client at its own institution, the bank typically has no way to associate the accounts with the client's accounts at other institutions. Credit reporting agencies, on the other hand, utilize individual identity fields, such as a social security number, to connect account histories and behavior from multiple financial institutions into a single hub and spoke data model. Again, the efficacy of this service relies on the credit reporting agency's ability to uniquely identify the individual account holder.

In present systems, unfortunately, the need to identify the individual raises a number of privacy concerns. In many of these systems, the information used to uniquely identity the individual, such as social security numbers, addresses, and phone numbers, can be tied back to an individual with confidence. Thus, given the potential, if not certainty, of security failure in any Internet connected system, the individual's identity and important private data, such as financial and medical records, are at risk.

Accordingly, there is a need for a new model of authentication and authorization that allows for authentication of an individual with a high degree of certainty, while eliminating the possibility of discovering the individual's true identity from the central hub. More particularly, there is a need for a device that aggregates and associates private data from multiple databases, while authenticating each individual using data that, if intercepted or discovered, would fail to reveal the identity of the individual.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for an anonymous association system utilizing biometrics, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, an anonymous association system utilizing biometrics provides the ability to aggregate and associate data about individuals without knowing or being able to deduce who they are. Although biometrics can be tied back to a unique individual with a very high degree of certainty, biometrics do not, by themselves, identify the individual without other individually identifiable information being associated with those biometrics. More particularly, various exemplary embodiments operate on the premise that a biometric marker, such as a finger print, may be used in an indirect fashion to create a matrix of associations among an individual's ancillary data elements. In this manner, identifying information is not associated with the biometric marker or identifying information held at the central hub.

Accordingly, in various exemplary embodiments, a device for interaction with an anonymous database system comprises: a biometric input that receives biometric data from a user; a communicator configured to retrieve, using the biometric data, a key stored in a first enrollment process, retrieve, using the key, an institution identifier and a user identifier stored in a second enrollment process, and retrieve user data from an institution database corresponding to the institution identifier; and a display that displays the retrieved user data.

Furthermore, in various exemplary embodiments, a method of enrolling a user in an anonymous database system comprises: performing a first enrollment process by interacting with a user, the first enrollment process comprising: receiving first biometric data from the user, and storing, in a first database, the first biometric data in association with a key; and performing a second enrollment process by interacting with an institution, the second enrollment process comprising: verifying the identity of the user at the institution, receiving second biometric data from the user, retrieving the key from the first database using the second biometric data, and storing, in a second database, the key, an identifier uniquely identifying the institution, and an identifier uniquely identifying the user at the institution.

In addition, in various exemplary embodiments, an anonymous database system comprises: a plurality of biometric nodes in communication with one another, each of the plurality of biometric nodes comprising a biometric input that receives biometric data from a user; at least one central database in communication with the plurality of biometric nodes; and a plurality of institution databases in communication with the plurality of biometric nodes, wherein a first node of the plurality of biometric nodes is configured to receive a message from a second node of the plurality of biometric nodes, the message requesting authorization of data access by the second node.

Finally, in various exemplary embodiments, a method for performing an action requiring multiple levels of authentication comprises: receiving a request to perform an action from a first user operating a first biometric node; receiving biometric data from the user; determining, using the biometric data, whether additional authorization is required to allow the requested action to proceed; sending a request for additional authorization to a second biometric node when additional authorization is required; receiving authorization data at the second biometric node; and allowing the requested action to proceed.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
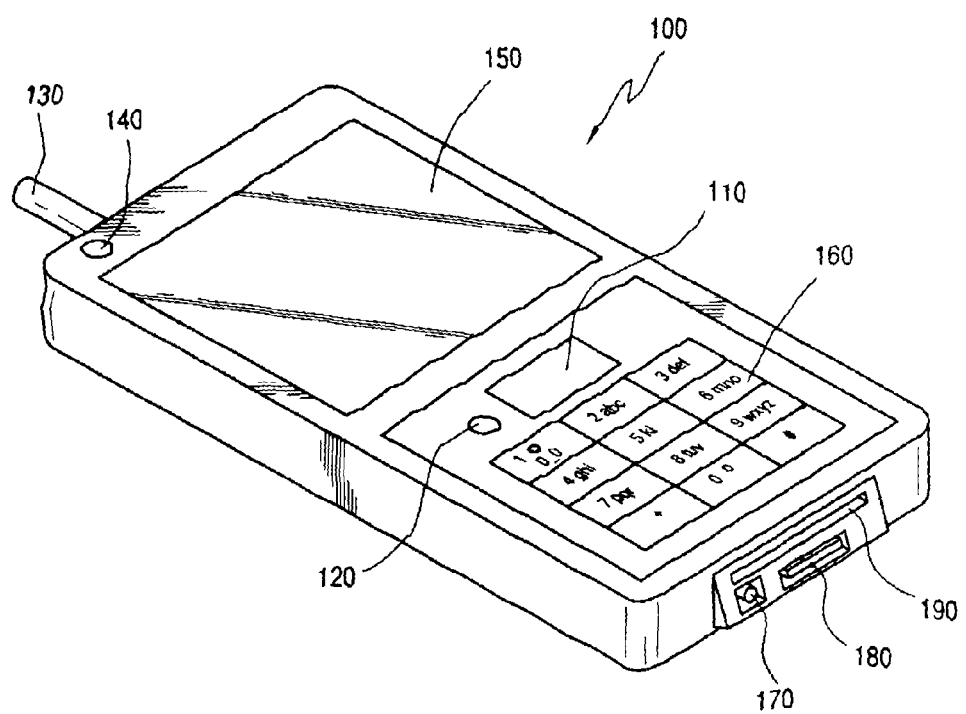
FIG. 1 is a perspective view of an exemplary embodiment of a biometric node.

Referring now to the drawings, in which like numerals refer to like components or steps, there are disclosed broad aspects of various exemplary embodiments.

FIG. 1 is a perspective view of an exemplary embodiment of a biometric node 100. Biometric node 100 includes biometric input 110, biometric indicator 120, communicator 130, connection indicator 140, display 150, alphanumeric input 160, power connector 170, computer interface 180, and card slot 190.

In various exemplary embodiments, biometric input 110 is a component configured to obtain a biometric reading to uniquely identify an individual. Thus, in various exemplary embodiments, biometric input 110 is a fingerprint reader. Accordingly, when an individual presses a thumb or finger against biometric input 110, biometric input 110 scans the thumb or finger and encodes the reading into a digital representation of the biometric. It should be apparent that any encoding method known to those of ordinary skill in the art may be utilized to encode the biometric data. Furthermore, the encoding algorithm utilized by biometric input 110 may be updated using a software or firmware upgrade.

It should also be apparent that although shown as a fingerprint reader, biometric input 110 may be any device capable of analyzing one or more physiological or behavioral characteristics that uniquely identify an individual. Thus, in various exemplary embodiments, biometric input 110 is instead a palm print reader, retina scanner, iris scanner, face recognition device, or any other device that reads unique physical characteristics of an individual. In addition, biometric input 110 may be a device that analyzes a DNA-containing sample, such as blood, hair, or saliva. Alternatively, in various exemplary embodiments, biometric input 110 is a microphone that receives a voice sample, which may in turn be used to identify the individual. Furthermore, to provide additional security, two or more biometrics may be used in combination.

Although illustrated as integrated into biometric node 100, in various exemplary embodiments, biometric input 110 is a separate device connected to biometric node 100 using any interface including, but not limited to, Universal Serial Bus (USB), FireWire, and Wi-Fi. Alternatively, biometric input 110 may be a replaceable module that integrates directly into biometric node 100. Accordingly, in these embodiments, biometric input 110 may be replaced in the event of damage or other failure.

In various exemplary embodiments, biometric indicator 120 displays the current status of biometric input 110. Thus, biometric indicator 120 may be a Light Emitting Diode (LED) that changes colors to indicate the status of a biometric scan. For example, biometric indicator 120 may be unlit when biometric input 110 is inactive, yellow when biometric input 110 is obtaining a biometric reading, green when biometric input 110 successfully obtains a biometric reading, and red when an attempted biometric reading fails. Alternatively, in various exemplary embodiments, biometric indicator 120 is an icon, text, or other information field displayed on display 150.

In various exemplary embodiments, communicator 130 exchanges data with one or more databases, described in further detail below with reference to FIG. 2. Thus, in various exemplary embodiments, communicator 130 is an antenna capable of sending and receiving data via a wireless connection over a Transmission Control Protocol/Internet Protocol (TCP/IP) network. Alternatively, in various exemplary embodiments, communicator 130 is an Ethernet jack or any other interface, wired or wireless, that allows biometric node 100 to communicate with an external database. It should be apparent that any protocol may be used for communication between communicator 130 and the external database.

In various exemplary embodiments, connection indicator 140 displays the current status of the connection between biometric node 100 and one or more external databases. Thus, connection indicator 140 may be an LED that changes colors to indicate the status of the connection. For example, biometric indicator 120 may be yellow when communicator 130 is attempting to establish a connection with the external database, green when communicator 130 has successfully established a connection, and red when communicator 130 has failed to establish a connection. Alternatively, connection indicator 140 may be an icon, text, or other information field displayed on display 150.

In various exemplary embodiments, display 150 is used to convey information to the user of biometric node 100. As described in further detail below with reference to FIG. 8, display 150 displays data received by communicator 130 from one or more external databases. Thus, in various exemplary embodiments, display 150 is a Liquid Crystal Display (LCD). It should be apparent, however, that any technology suitable for displaying information to a user may be used. Furthermore, it should be apparent that, in various exemplary embodiments, display 150 may instead be an external display connected to a biometric node 100 without a display.

Moreover, in various exemplary embodiments, display 150 is a touch screen display that enables a user to input commands by touching the surface of display 150. Thus, in these embodiments, display 150 may output buttons or objects that may be pressed by the user to execute a command. For example, display 150 may output a button labeled, "Show Data," which allows a user to retrieve data based on a biometric entered into biometric input 110.

In various exemplary embodiments, alphanumeric input 160 is used to receive data and commands from a user of biometric node 100. Accordingly, alphanumeric input 160 may receive a personal identification number (PIN), other optional data, and commands to transfer and/or display data. Thus, in various exemplary embodiments, alphanumeric input 160 is an array of buttons arranged in a telephone-style layout, such that each button is used for a number and multiple letters. Alternatively, in various exemplary embodiments, alphanumeric input 160 is an array of buttons arranged in a QWERTY layout. Although illustrated as separate from display 150, it should be apparent that alphanumeric input 160 may instead be integrated into display 150 using touch screen technology.

In various exemplary embodiments, power connector 170 provides an interface for connecting biometric node 100 to a power source. Thus, in various exemplary embodiments, power connector 170 is a male pin that receives a female connector of an AC adapter. Accordingly, biometric node 100 may be connected to a power source via power connector 170 to charge a battery (not shown) of biometric node 100.

In various exemplary embodiments, computer interface 180 provides a connection between biometric node 100 and a personal computer (PC) of the user (not shown). Accordingly, computer interface 180 may be a USB slot, FireWire input, serial input, wireless interface, or any other interface that may be used to connect an external device to a PC. Thus, although biometric node 100 may operate as a standalone device, biometric node 100 may also be connected to a PC to allow data exchange with the PC. Accordingly, it should be apparent that, in various exemplary embodiments, biometric node 100 does not directly communicate with the external databases, but instead exchanges data with the external databases using a PC as a conduit.

In various exemplary embodiments, card slot 190 provides an interface for receiving a smart card, flash memory device, or any other external device that may store information. Thus, in various exemplary embodiments, card slot 190 enables a user to insert a smart card or other device to assist in authorization. For example, biometric node 100 may determine that a higher level authorization is necessary to allow access to the data and require the user to insert a smart card prior to aggregating the data. Alternatively, a smart card or other device may be inserted into card slot 190 to indicate the data the user desires to retrieve. For example, a user may insert a card associated with a bank to retrieve financial records, while inserting a card associated with a hospital to retrieve medical records.

It should be apparent that the above-described functionality of biometric node 100 may be implemented using a number of alternatives. Thus, in various exemplary embodiments, biometric node 100 includes a complementary metal oxide semiconductor (CMOS) chip, which may include embedded logic for controlling the operation of the components of biometric node 100. In these embodiments, the operation of biometric node 100 may be updated utilizing a firmware update. Alternatively, in various exemplary embodiments, exchange of data of biometric node 100 is controlled by a customized software installation on a PC or using a web portal to transfer data in conjunction with the data obtained by the biometric device. Thus, in these embodiments, the operation of biometric node 100 may be updated utilizing a software and/or firmware update.

Figure 2:
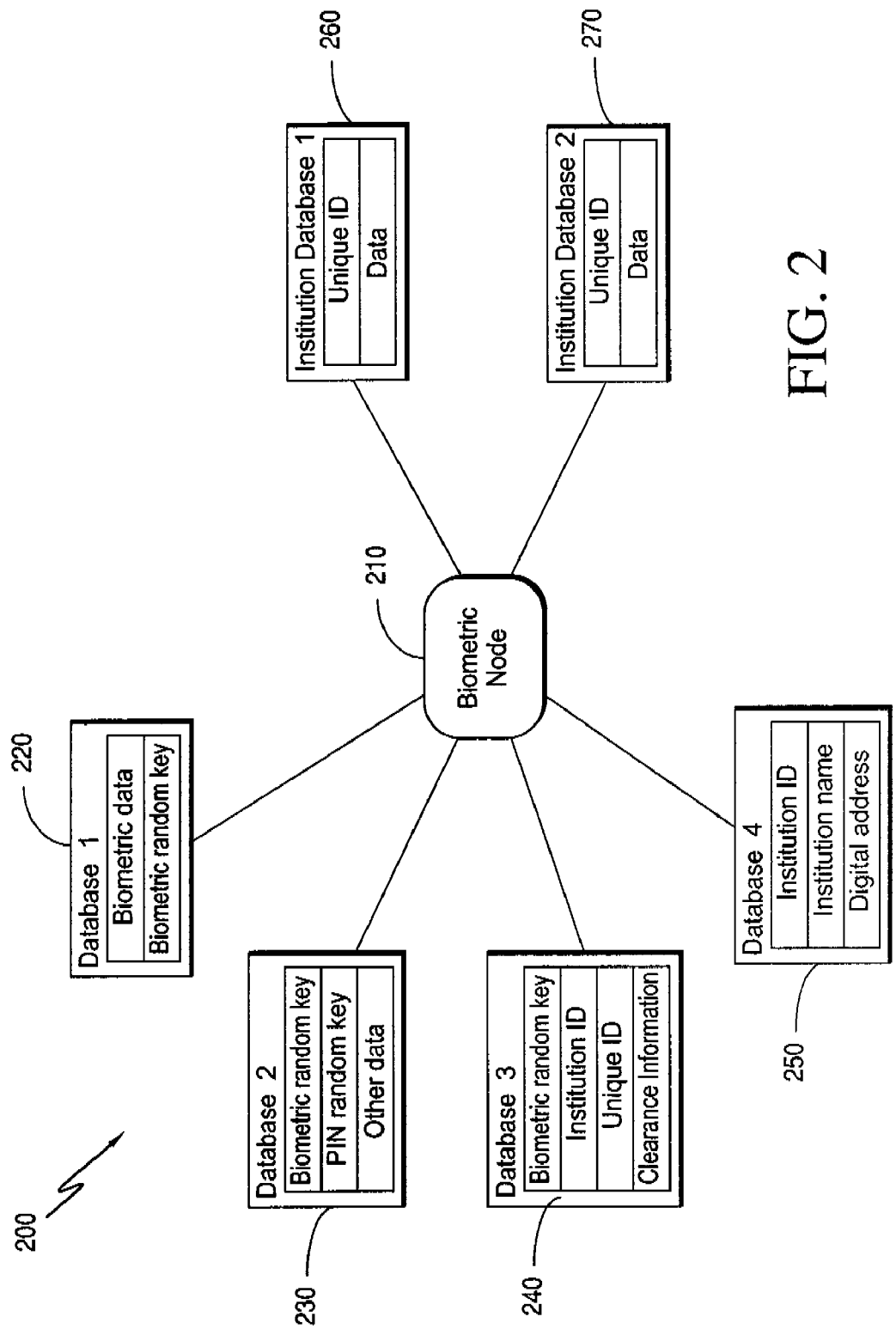
FIG. 2 is a schematic diagram of an exemplary embodiment of an anonymous association system using biometrics.

FIG. 2 is a schematic diagram of an exemplary embodiment of an anonymous association system 200. Anonymous association system 200 includes biometric node 210, database 1 220, database 2 230, database 3 240, database 4 250, institution database 1 260, and institution database 2 270.

In various exemplary embodiments, biometric node 210 is a standalone device including features described above with reference to biometric node 100. Alternatively, biometric node 210 may be a PC operated in conjunction with biometric node 100. In various exemplary embodiments, biometric node 210 communicates with each of the databases 220, 230, 240, 250, 260, 270. The address of each of the databases 220, 230, 240, 250 may be preconfigured via a URL alias encoded in the firmware of biometric node 210. Accordingly, the URL alias may be modified by firmware update of biometric node 210, preferably utilizing public key encryption to prevent unauthorized firmware upgrades.

In various exemplary embodiments, biometric node 210 is a device operated by a user. Thus, biometric node 210 may be operated by a user to perform a person-level enrollment process, as described in further detail below with reference to FIGS. 3-5. Furthermore, biometric node 210 may be operated by a user to retrieve and aggregate data, as described in further detail below with reference to FIGS. 8 and 9.

Alternatively, in various exemplary embodiments, biometric node 210 is instead a device operated by an institution. Thus, biometric node 210 may be utilized by an institution to perform an institution-level enrollment process, as described in further detail below with reference to FIGS. 6 and 7. It should be apparent, however, that both person-level enrollment and institution-level enrollment may be performed utilizing a user device.

In various exemplary embodiments, database 1 220, database 2 230, database 3 240, and database 4 250 are centrally located databases used to provide association and aggregation services. In various exemplary embodiments, databases 220, 230, 240, 250 do not store openly identifiable individual information. Furthermore, in various exemplary embodiments, databases 220, 230, 240, 250 are not directly connected to institution databases 260, 270. Thus, even in the event of a security compromise at one or more of the databases 220, 230, 240, 250, the identities of individuals using anonymous association system 200 remain concealed.

In various exemplary embodiments, database 1 220 stores raw biometric data provided by a user in association with a biometric random key. Thus, the raw biometric data may be a fingerprint data set, retinal scan data set, or any other biometric data obtained by biometric input 110. Furthermore, biometric random key may be a globally unique identifier associated with the raw biometric data. Accordingly, in various exemplary embodiments, there is a one-to-one correspondence between raw biometric data and biometric random keys, such that the biometric random key for a particular user may be obtained by performing a search using the biometric data.

Furthermore, in various exemplary embodiments, database 2 230 stores the biometric random key in association with a PIN random key and other optional data. Thus, in various exemplary embodiments, when a user provides a PIN along with the biometric data, database 2 230 generates a hash-encrypted PIN random key and stores the PIN random key in association with the biometric random key. It should be apparent, however, that any suitable encryption algorithm may be utilized to generate the encrypted random key.

In various exemplary embodiments, database 3 240 stores the biometric random key in association with several pieces of data. This data may include an institution ID, which uniquely identifies an institution participating in anonymous association system 200. Thus, each institution ID may identify an institution that stores records in a database, such as institution database 1 260 or institution database 2 270. For example, the institution ID could identify a bank, hospital, government agency, or any other entity that provides access to data through anonymous association system 200.

In addition, the data stored in database 3 240 may include a unique ID, which may uniquely identify, within the institution, the individual associated with the biometric random key. For example, the unique ID may be an account number, random number, or any other alphanumeric value that uniquely identifies the individual at the institution.

In addition, the data stored in database 3 240 may include security clearance information or additional authorization information. Thus, the security clearance information could indicate that the data stored in the institution for an individual identified by the unique ID may only be accessed when accompanied by an additional biometric or other piece of information. For example, the security clearance information may indicate that a biometric from a second person, such as a manager or employee, is required to permit access to the data. Alternatively, the security clearance information may indicate that a smart card must be inserted into card slot 190 or that a password or other alphanumeric value must be entered.

In various exemplary embodiments, database 4 250 is an institutional dictionary that stores information used to access the data stored in institutional databases 260, 270. Thus, database 4 250 may store an institution ID identifying a participating institution, the name of the institution, and a digital address identifying the location of the associated institutional database. For example, the digital address may include a URL, IP address, and any other information necessary to connect to the database, including port numbers, passwords, and the like. The URL, IP address, and other information may be pre-registered for each institution, manually configured, or automatically configured.

In various exemplary embodiments, institution database 1 260 and institution database 2 270 are databases operated by institutions. Thus, in various exemplary embodiments, databases 260, 270 store one or more fields of data in association with a value uniquely identifying an individual. Databases 260, 270 may store any type of data including, but not limited to, medical records, bank records, credit scores, educational information, and criminal histories.

Although illustrated as including four centrally located databases 220, 230, 240, 250 and two institutional databases 260, 270, it should be apparent that other data arrangements are contemplated. Thus, in various exemplary embodiments, databases 220, 230, 240, 250 are each stored on a separate server to provide maximal security. Alternatively, in various exemplary embodiments, each of the databases 220, 230, 240, 250 are located on a single, centralized server. Furthermore, in various exemplary embodiments, anonymous association system 200 includes any number of institutional databases. Moreover, anonymous association system 200 may include additional databases or data fields omitted from FIG. 2 for the sake of simplicity.

Figure 3:
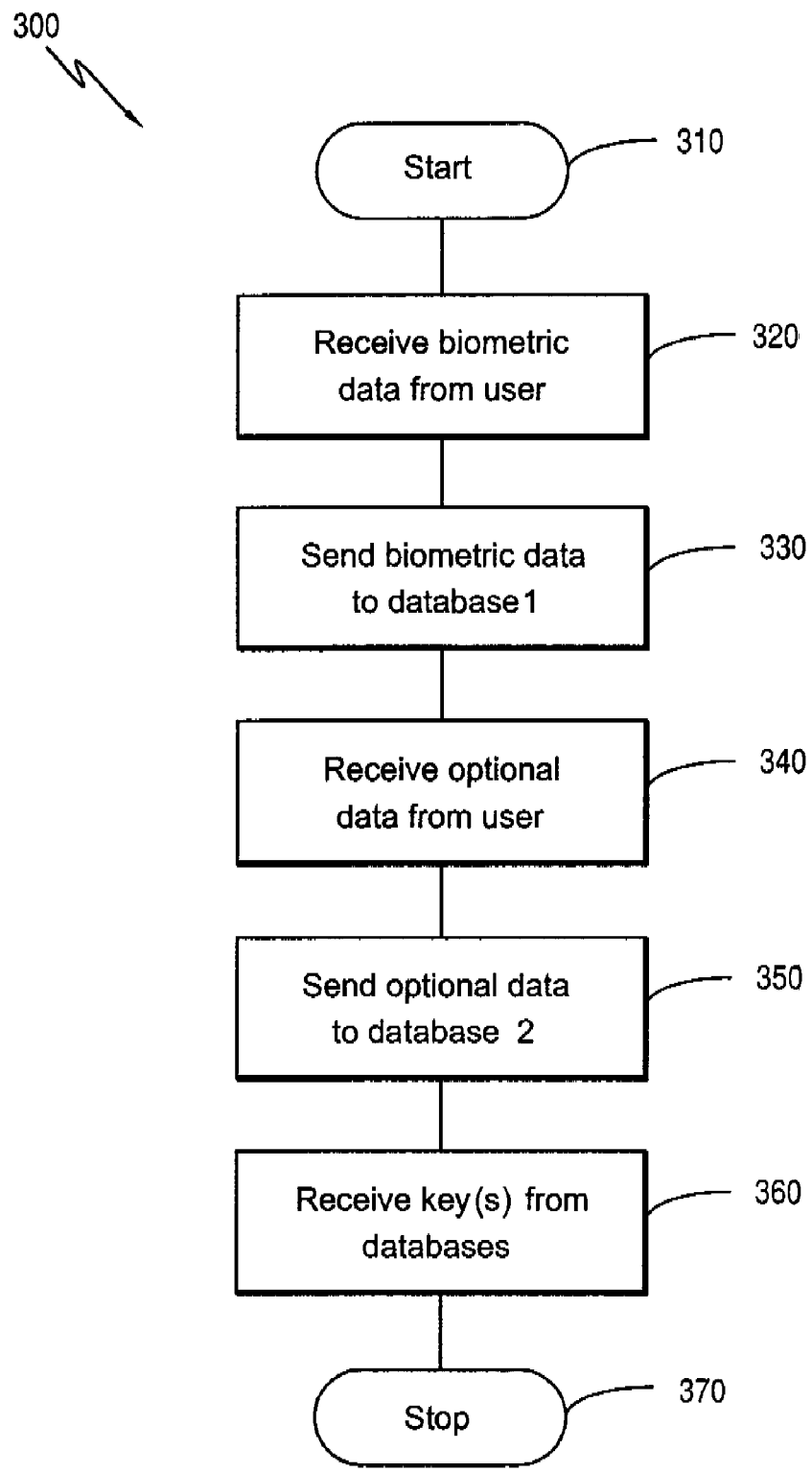
FIG. 3 is a flowchart of an exemplary embodiment of a method for person-level enrollment executed at a biometric node.

FIG. 3 is a flowchart of an exemplary embodiment of a method 300 for person-level enrollment executed at a biometric node 210. Exemplary method 300 starts in step 310 and proceeds to step 320, where biometric node 210 receives biometric data from a user. Thus, in various exemplary embodiments, biometric node 210 obtains a biometric reading from the user via biometric input 110. More particularly, in various exemplary embodiments, biometric input 110 receives raw biometric data and encodes the raw data into a digital representation.

After obtaining the biometric data in step 320, exemplary method 300 proceeds to step 330, where biometric node 210 sends the biometric data to a centralized database of anonymous association system 200, such as database 1 220. The processing performed by this database is described in further detail below with reference to FIG. 4.

Exemplary method 300 then proceeds to step 340, where biometric node 210 optionally receives additional data from the user. More particularly, in various exemplary embodiments, biometric node 210 acquires a PIN, password, or other alphanumeric key from user via alphanumeric input 160, an attached keyboard, or some other input device.

After obtaining the optional data in step 340, exemplary method 300 proceeds to step 350, where biometric node 210 sends the optional data to a centralized database of anonymous association system 200, such as database 2 230. The processing performed by this database is described in further detail below with reference to FIG. 5.

Exemplary method 300 then proceeds to step 360, where biometric node 210 receives one or more keys from the corresponding databases. Thus, in response to sending biometric data to database 1 220, biometric node 210 receives a biometric random key from database 1 220. Furthermore, when biometric node 210 sends optional data to database 2 230, biometric node 210 receives a PIN random key from database 2 230. Generation of these keys is described in further detail below with reference to FIGS. 4 and 5. After receiving one or more keys in step 360, exemplary method 300 proceeds to step 370, where exemplary method 300 stops.

Figure 4:
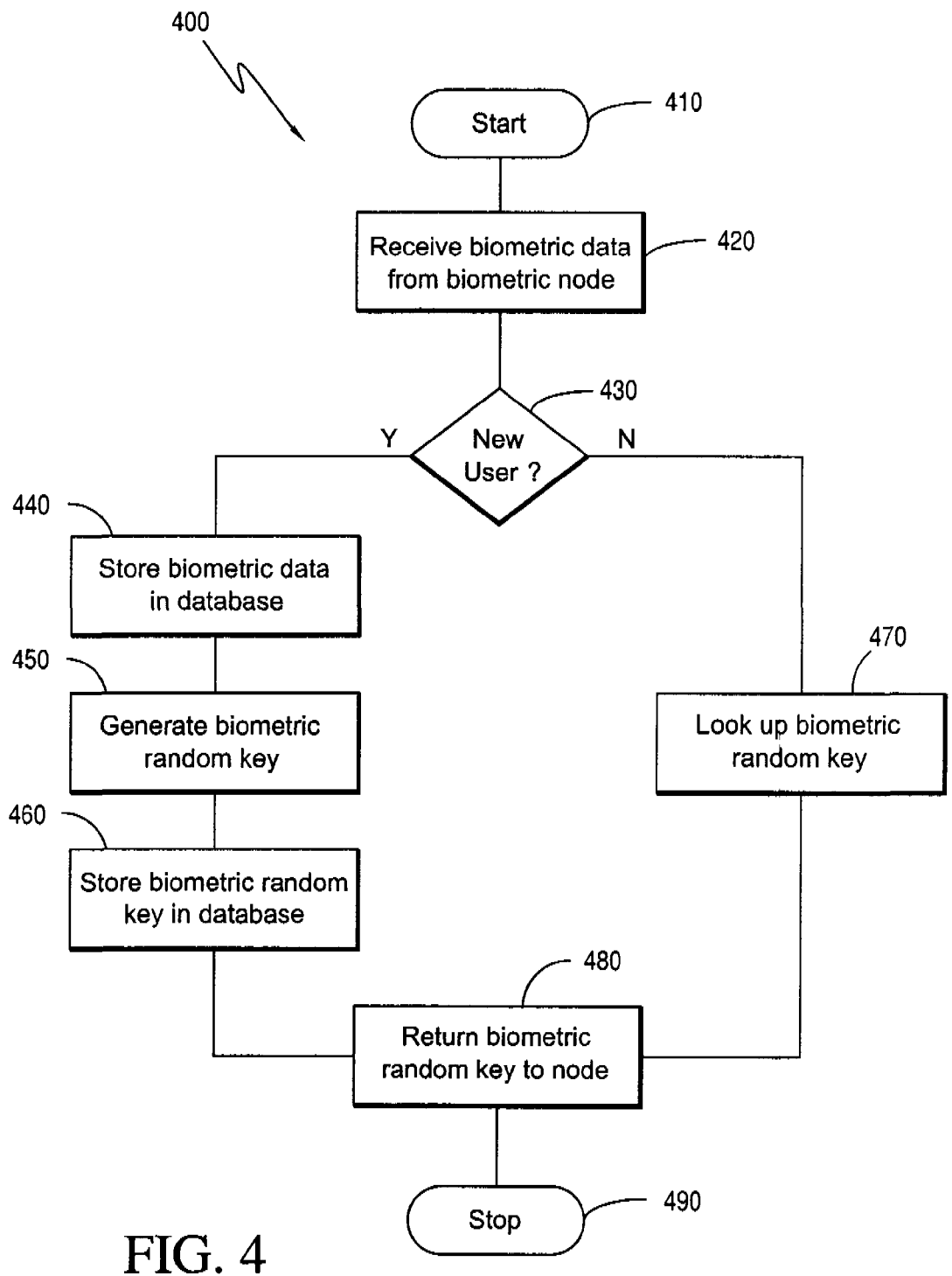
FIG. 4 is a flowchart of an exemplary embodiment of a method for person-level enrollment executed at a first database.

FIG. 4 is a flowchart of an exemplary embodiment of a method 400 for person-level enrollment executed at a first database, such as database 1 220. Exemplary method 400 starts in step 410 and proceeds to step 420, where database 1 220 receives biometric data from biometric node 210. Exemplary method 400 then proceeds to step 430, where database 1 220 performs a query to determine whether the received biometric data is associated with a new user.

When, in step 430, it is determined that the user has not yet enrolled with the anonymous association system 200, exemplary method 400 proceeds to step 440, where database 1 220 stores the biometric data. Exemplary method 400 then proceeds to step 450, where database 1 220 generates a biometric random key. It should be apparent that, as described in further detail above with reference to FIG. 2, biometric random key may be a globally unique identifier associated with the biometric data. After generating the biometric random key in step 450, exemplary method 400 proceeds to step 460, where database 1 220 stores the biometric random key in association with the biometric data.

On the other hand, when, in step 430, it is determined that the user has already performed person-level enrollment and is therefore not a new user, exemplary method 400 proceeds to step 470. In step 470, database 1 220 performs a query to look up the corresponding biometric random key 210 using the biometric data received from biometric node 210.

After storing the biometric random key in step 460 or looking up the biometric random key in step 470, exemplary method 400 proceeds to step 480, where database 1 220 returns the biometric random key to biometric node 210. Exemplary method 400 then proceeds to step 490, where exemplary method 400 stops.

Figure 5:
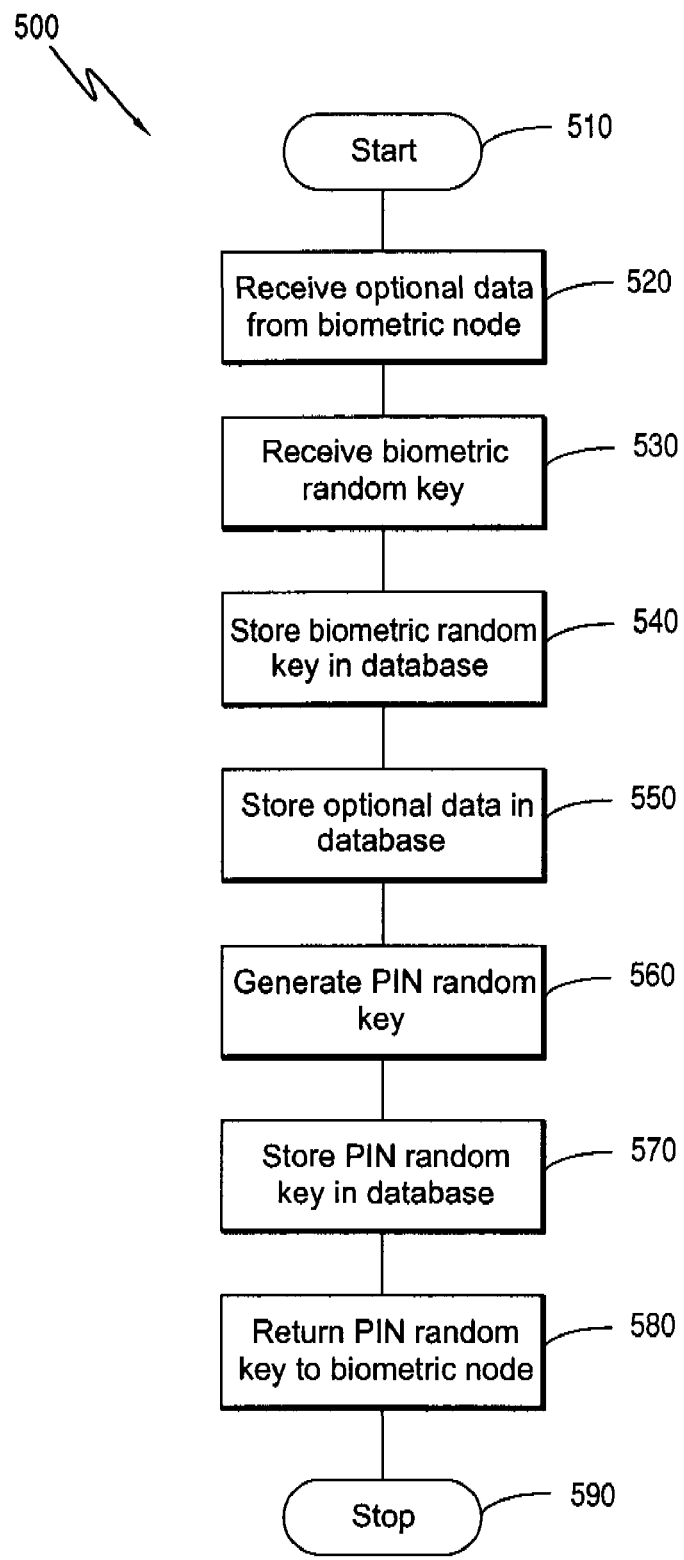
FIG. 5 is a flowchart of an exemplary embodiment of a method for person-level enrollment executed at a second database.

FIG. 5 is a flowchart of an exemplary embodiment of a method 500 for person-level enrollment executed at a database, such as database 2 230. Exemplary method 500 starts in step 510 and proceeds to step 520, where database 2 230 receives optional data from biometric node 210, such as a PIN or password.

Exemplary method 500 then proceeds to step 530, where database 2 230 receives the biometric random key. It should be apparent that the biometric random key may be sent from database 1 220 to database 2 230 when the biometric random key is generated. Alternatively, the biometric random key may be sent from biometric node 210 to database 2 230 after database 1 220 returns the key to biometric node 210.

After receiving the biometric random key in step 530, exemplary method 500 proceeds to step 540, where database 2 230 stores the biometric random key. Exemplary method 500 then proceeds to step 550, where database 2 230 optionally encrypts, then stores the optional data in association with the biometric random key.

After storing the biometric random key and optionally encrypting and storing the optional data, exemplary method 500 proceeds to step 560, where database 2 230 generates a PIN random key. It should be apparent that, as described in further detail above with reference to FIG. 2, PIN random key may be a globally unique identifier associated with the PIN or password. After generating the PIN random key in step 560, exemplary method 500 proceeds to step 570, where database 2 230 stores the PIN random key in association with the biometric random key and other data.

After generating and storing the PIN random key, exemplary method 500 proceeds to step 580, where database 2 230 optionally returns the PIN random key to biometric node 210. Exemplary method 500 then proceeds to step 590, where exemplary method 500 stops.

Figure 6:
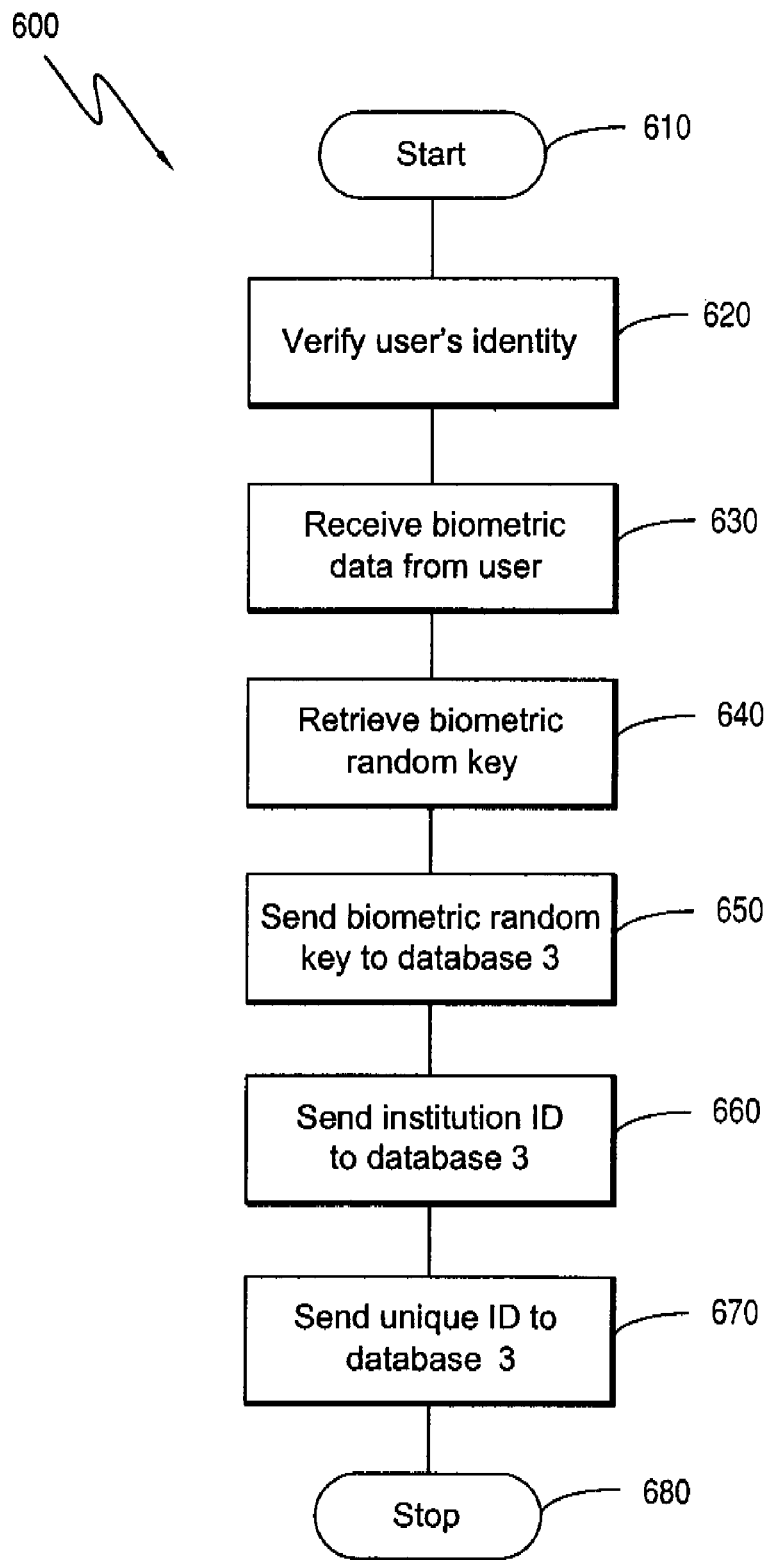
FIG. 6 is a flowchart of an exemplary embodiment of a method for institution-level enrollment executed at a biometric node.

FIG. 6 is a flowchart of an exemplary embodiment of a method 600 for institution-level enrollment executed at biometric node 210. Exemplary method 600 starts in step 610 and proceeds to step 620, where the user's identity is verified.

In various exemplary embodiments, biometric node 210 is operated by an institution, such that the user seeking to initiate institution-level enrollment is physically present at one of the institution's locations. Thus, in such embodiments, in step 620, the institution may perform a procedure to verify that the user is the person he or she purports to be. For example, an employee of the institution may verify the user's identity by performing a process including, but not limited to, examining a photo ID, requiring the person to provide personal information, and/or obtaining a signature. Furthermore, the operator of anonymous association system 200 may establish minimum standards an institution must observe in verifying the identity of the user.

Alternatively, in various exemplary embodiments, biometric node 210 is operated by a user seeking to initiate institution-level enrollment at an institution for which there is no readily-accessible physical location. For example, a user may desire to access his or her data stored at a web-based institution, such as a credit agency or online bank. In such embodiments, several methods of verifying the user's identity may be used.

First, in various exemplary embodiments, the user opens or logs into an account at the institution using biometric node 210, a personal computer, or any other web-enabled device. By verifying that the user has proper authentication to access his or her account, the institution may be reasonably certain that the actual user is the registered owner of the account. As an alternative to web-based identify verification, the institution may instead rely on in-person identity verification conducted at a proxy institution. Thus, for example, a user may perform institution-level enrollment in person at a bank and simultaneously perform institution-level enrollment for the web-based institution.

After verifying the user's identity in step 620, exemplary method 600 proceeds to step 630, where biometric node 210 obtains a biometric reading from the user via a biometric input. More particularly, in various exemplary embodiments, the biometric input receives raw biometric data and encodes the raw data into a digital representation.

Exemplary method 600 then proceeds to step 640, where biometric node 210 retrieves the biometric random key. In various exemplary embodiments, as described in further detail above with reference to FIG. 4, biometric node 210 sends the biometric data to database 1 220, which searches for a biometric random key associated with the biometric data. When database 1 220 does not find an existing entry, database 1 220 enrolls the user, as described in further detail above with reference to steps 440, 450, and 460 of FIG. 4. Alternatively, when database 1 220 finds an existing entry, database 1 220 simply looks up the biometric random key, as described in further detail above with reference to step 470 of FIG. 4. In either case, database 1 220 returns the biometric random key to biometric node 210.

After retrieving the biometric random key in step 640, exemplary method 600 proceeds to step 650, where biometric node 210 sends the retrieved biometric random key to database 3 240. Exemplary method 600 then proceeds to step 660, where biometric node 210 sends, to database 3 240, the institution ID of the institution at which the user is registering. More particularly, in various exemplary embodiments, the on-chip software of biometric node 210 is embedded with the institution ID, such that the institution ID can be retrieved from biometric node 210. Alternatively, in various exemplary embodiments, an employee or other agent of the institution enters the institution ID into biometric node 210. As a third alternative, in various exemplary embodiments, biometric node 210 retrieves the institution ID from a computer system located at or connected to the institution. Finally, as a fourth alternative, in various exemplary embodiments, biometric node 210 retrieves the institution ID from a smart card inserted into biometric node 210.

Exemplary method 600 then proceeds to step 670, where biometric node 210 sends, to database 3 240, the unique ID assigned by the institution to identify the user. Exemplary method then proceeds to step 680, where exemplary method 600 stops.

Figure 7:
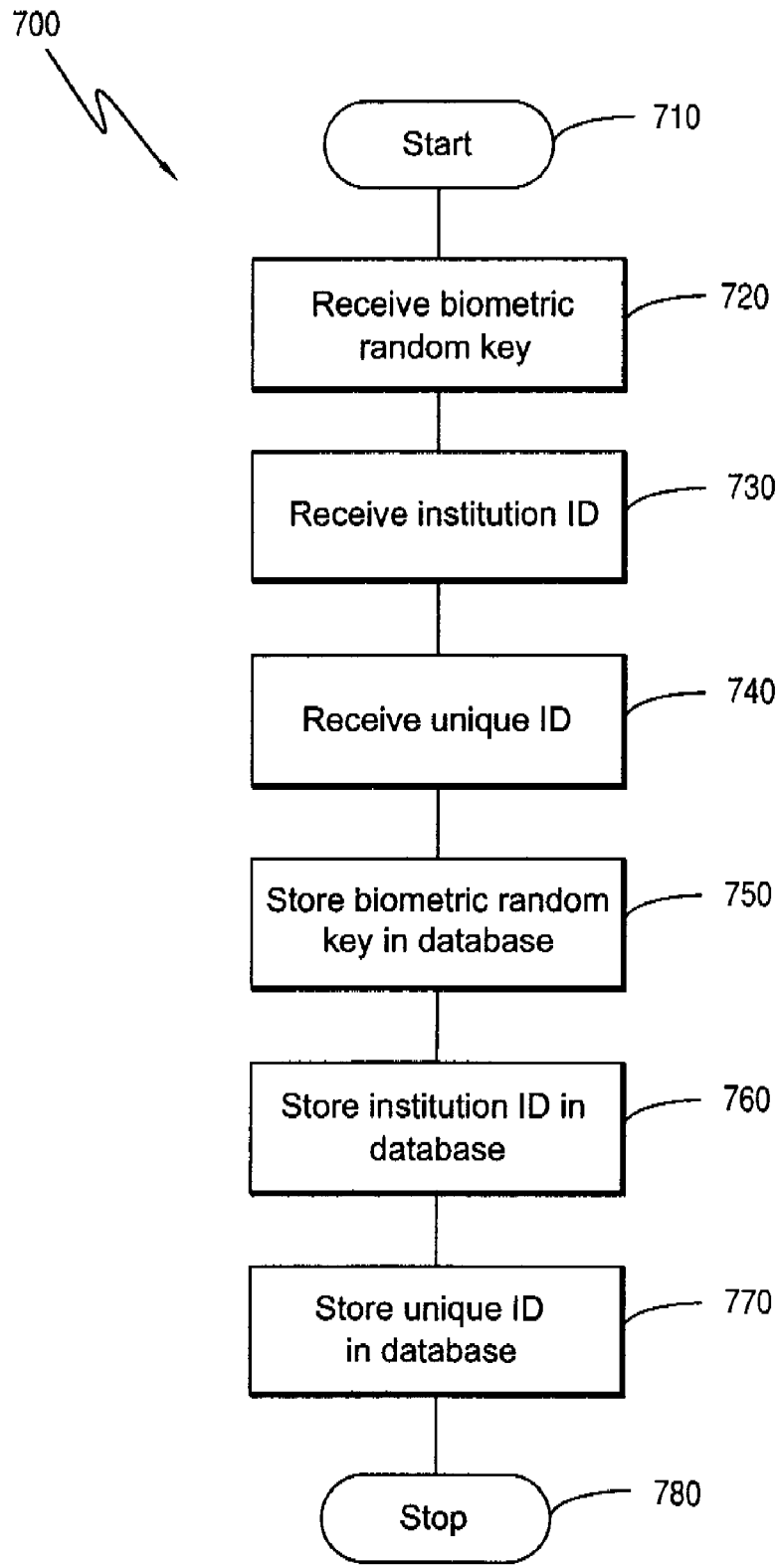
FIG. 7 is a flowchart of an exemplary embodiment of a method for institution-level enrollment executed at a database.

FIG. 7 is a flowchart of an exemplary embodiment of a method 700 for institution-level enrollment executed at a database, such as database 3 240. Exemplary method 700 starts in step 710 and proceeds to step 720, where database 3 240 receives the biometric random key from biometric node 210. Exemplary method 700 then proceeds to step 730, where database 3 240 receives the institution ID from biometric node 210, and then to step 740, where database 3 240 receives the unique ID identifying the user from biometric node 210.

After receiving the data in steps 720, 730, and 740, exemplary method 700 proceeds to step 750. In step 750, database 3 240 stores the biometric random key. Exemplary method 700 then proceeds to step 760, where database 3 240 stores the institution ID. Finally, exemplary method 700 proceeds to step 770, where database 3 240 stores the unique ID. Exemplary method 700 then proceeds to step 780, where exemplary method 700 stops.

It should be apparent from the forgoing description that, although described above as two separate procedures, person-level enrollment and institution-level enrollment need not be performed at different locations or times. More particularly, if, while performing institution-level enrollment, it is discovered that the user has not yet performed person-level enrollment, the system may dynamically execute the person-level enrollment process prior to proceeding with the institution-level enrollment process.

Figure 8:
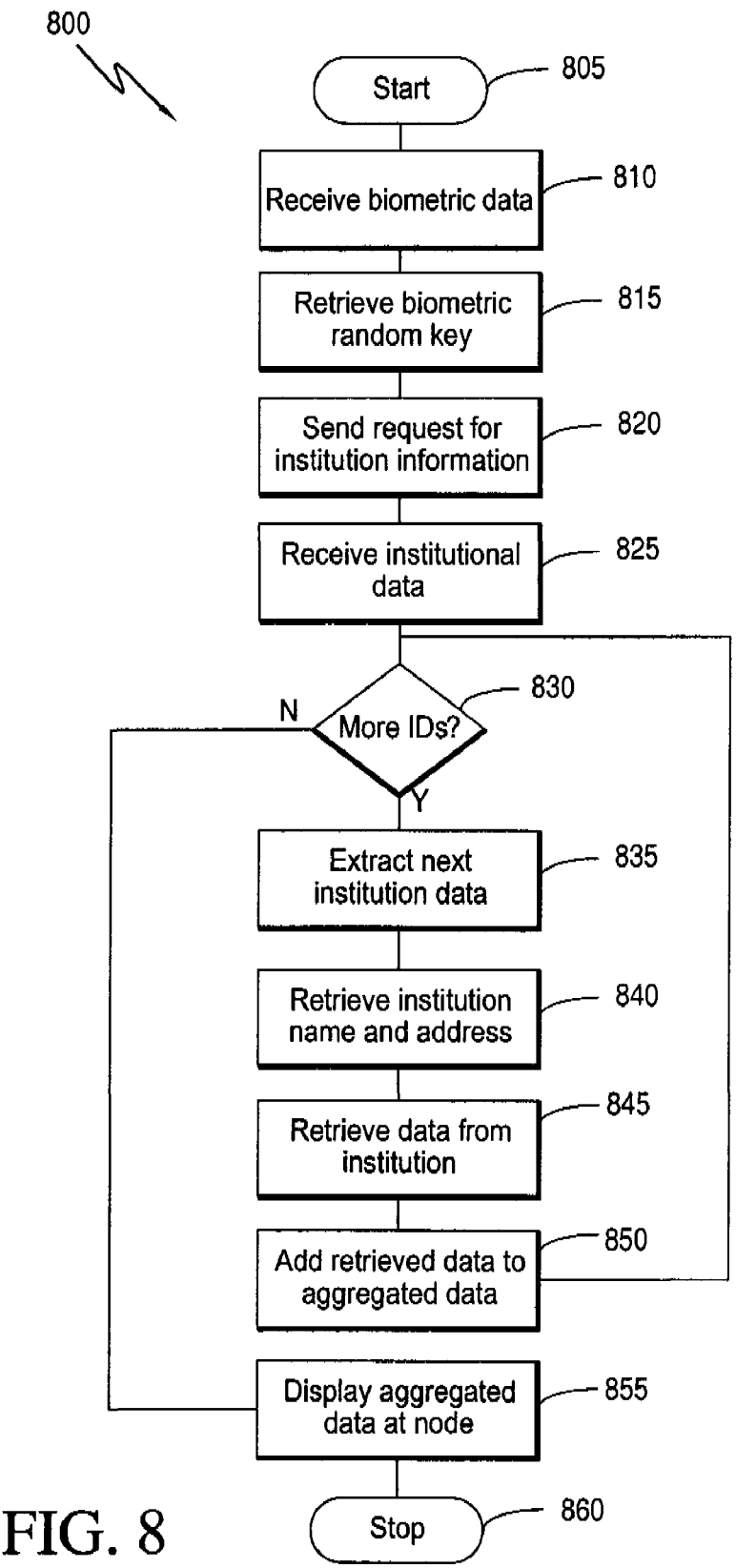
FIG. 8 is a flowchart of an exemplary embodiment of a method for data aggregation executed at a biometric node.

FIG. 8 is a flowchart of an exemplary embodiment of a method 800 for data aggregation executed at biometric node 210. More particularly, in various exemplary embodiments, exemplary method 800 is executed by a user at a biometric node 210 to retrieve data from disparate sources and display the data on the biometric node 210.

Exemplary method 800 starts in step 805 and proceeds to step 810, where biometric node 810 obtains a biometric reading from the user via a biometric input. More particularly, in various exemplary embodiments, the biometric input receives raw biometric data and encodes the raw data into a digital representation.

Exemplary method 800 then proceeds to step 815, where biometric node 210 retrieves the biometric random key using the raw biometric data. More particularly, in various exemplary embodiments, biometric node 210 sends the biometric data to database 1 220, which searches for and returns the corresponding biometric random key.

After receiving the biometric random key, exemplary method 800 proceeds to step 820, where biometric node 210 sends a request to a database, such as database 3 240, for information required to access the data stored on institution databases 260, 270. In various exemplary embodiments, this request includes the category of data required, such as banking or medical records. Alternatively, in various exemplary embodiments, the request includes the name of a single institution or indicates that the institution information should be retrieved for all institutions. Furthermore, the data desired to be retrieved may be set via user input through a menu system on display 150 or using alphanumeric input 160. Alternatively, the data desired to be retrieved may be set by inserting a smart card or other device into card slot 190.

After sending the request for institution information in step 820, exemplary method 800 proceeds to step 825, where biometric node 110 receives institution information from database 3 240. In various exemplary embodiments, the institution information is received from the database in response to processing performed by the database, as described in further detail below in connection with FIG. 9. Thus, the information received from database 3 240 may include a list of institution IDs and the unique ID of the user at each of the institutions. After receiving the institution information, exemplary method 800 proceeds to step 830.

When, in step 830, it is determined that there are additional institution IDs contained in the institution information, exemplary method 800 proceeds to step 835. In step 835, biometric node 210 extracts the next institution ID and unique ID contained in the institution information. Exemplary method 800 then proceeds to step 840, where biometric node 210 retrieves the institution name and digital address using the institution ID. More particularly, in various exemplary embodiments, biometric node 210 queries a database, such as database 4 250, by sending the institution ID to the database. The database, in turn, looks up the institution name and digital address corresponding to the institution ID, then returns the institution name and digital address to biometric node 210.

Exemplary method 800 then proceeds to step 845, where biometric node 210 retrieves the desired data from an institution database, such as institution database 1 260 or institution database 2 270. More particularly, in various exemplary embodiments, biometric node 210 sends a request for data to the digital address of the institution database including the unique ID and, optionally, details regarding the desired data. The institution database, in turn, looks up the desired data and returns the data to biometric node.

After receiving the data in step 845, exemplary method 800 proceeds to step 850, where biometric node 210 adds the received data to a temporary data structure for later display. Alternatively, in various exemplary embodiments, biometric node 210 immediately displays the data as it is received and does not perform steps 850 and 855. Exemplary method 800 then returns to step 830, where biometric node 210 determines whether additional institution IDs were included in the institution information.

When, in step 830, it is determined that there are no more institution IDs contained in the data received from the database, exemplary method 830 proceeds to step 850. In step 850, biometric node 210 accesses the data structure containing the aggregated data and displays this data to the user. Thus, in various exemplary embodiments, biometric node 210 displays the data to the user via display 150 or via a display connected to biometric node 210. In various exemplary embodiments, for added security, biometric node 210 then clears the temporary data structure containing the aggregated data from memory. Exemplary method 800 then proceeds to step 860, where exemplary method 800 stops.

Figure 9:
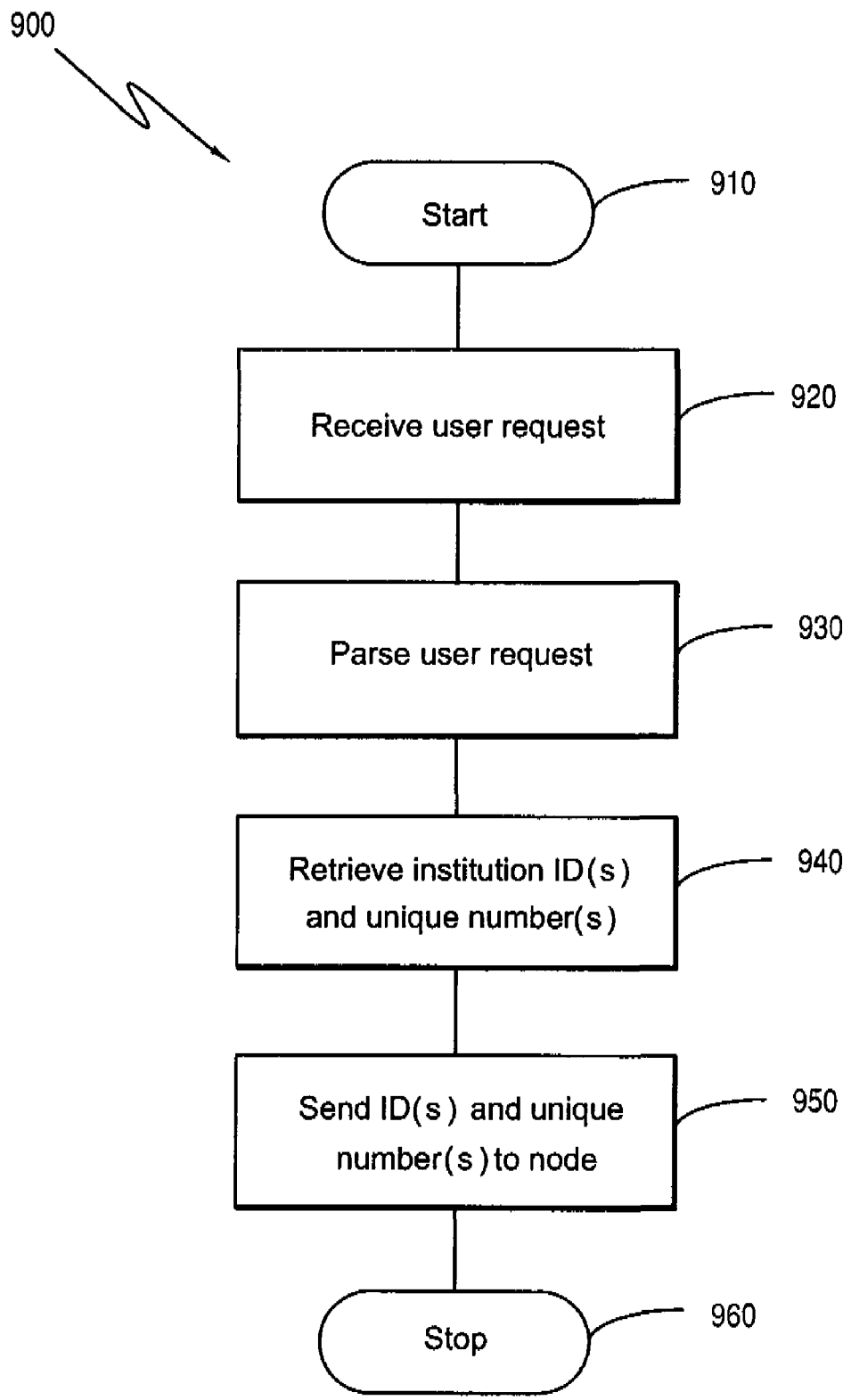
FIG. 9 is a flowchart of an exemplary embodiment of a method for data aggregation executed at a database.

FIG. 9 is a flowchart of an exemplary embodiment of a method 900 for data aggregation executed at a database. In various exemplary embodiments, exemplary method 900 is executed at database 3 240 upon receipt of an institution information request from a biometric node 210.

Exemplary method 900 starts in step 910 and proceeds to step 920, where database 3 240 receives a user request for institution information from biometric node 210, the request including a biometric random key of the user. Exemplary method 900 then proceeds to step 930, where database 3 240 parses the request. More particularly, in various exemplary embodiments, database 3 240 processes the request to determine what information the user has requested. Thus, database 3 240 may parse the request to determine the category of data, type of institutions, or any other parameters specified by the user.

After parsing the request in step 930, exemplary method 900 proceeds to step 940, where database 3 240 retrieves one or more institution IDs and corresponding unique IDs. More particularly, in various exemplary embodiments, database 3 240 accesses the data corresponding to the biometric random key received with the request. Based on the parsed request, database 3 240 retrieves, from this data, the institution IDs and unique IDs requested by the user.

After retrieving the institution IDs and corresponding unique IDs in step 940, exemplary method 900 proceeds to step 950, where database 3 240 sends the retrieved data to biometric node 210. Exemplary method 900 then proceeds to step 960, where exemplary method 900 stops.

Figure 10:
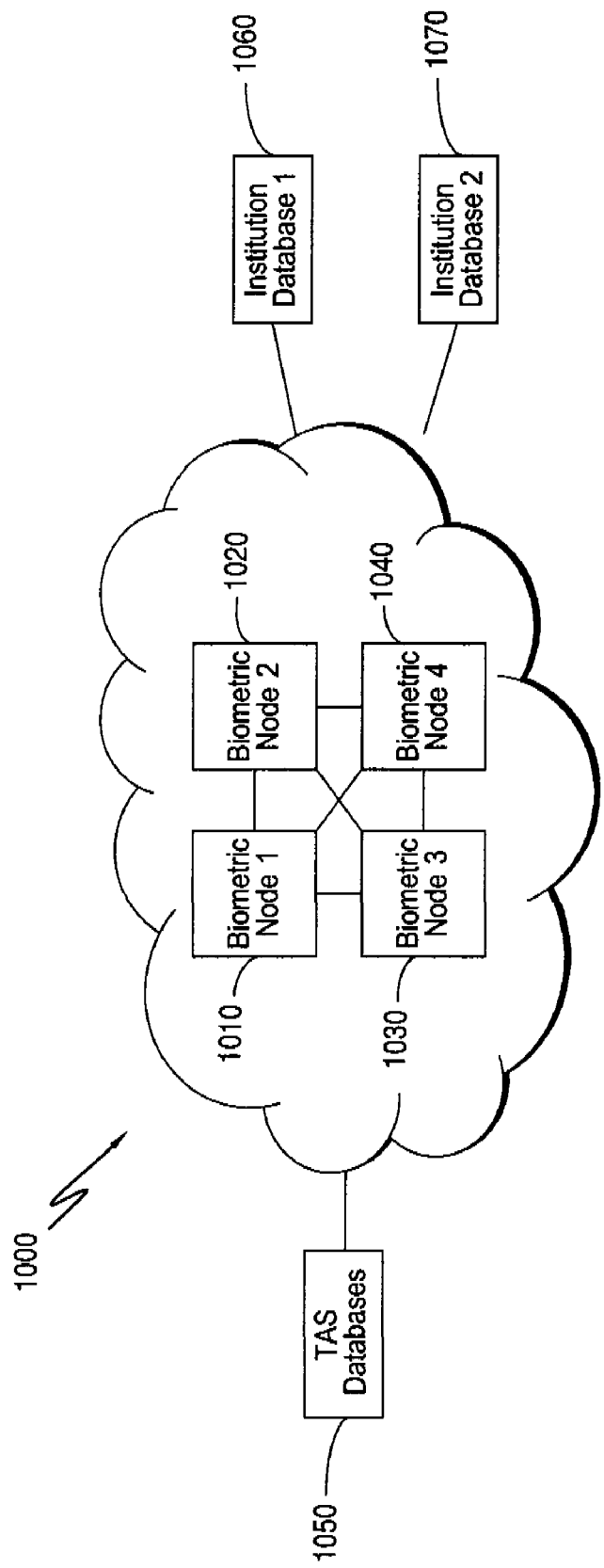
FIG. 10 is a schematic diagram of an exemplary embodiment of an anonymous association system including multiple biometric nodes.

FIG. 10 is a schematic diagram of an exemplary embodiment of an anonymous association system 1000 including multiple biometric nodes. In various exemplary embodiments, anonymous association system 1000 includes biometric node 1 1010, biometric node 2 1020, biometric node 3 1030, biometric node 4 1040, anonymous association databases 1050, institution database 1 1060, and institution database 2 1070.

In various exemplary embodiments, biometric nodes 1010, 1020, 1030, 1040 are centrally located devices that communicate with each of the databases 1050, 1060, 1070. Thus, one or more of biometric nodes 1010, 1020, 1030, 1040 is a standalone device including features described above with reference to biometric node 100. Alternatively, one or more of biometric nodes 1010, 1020, 1030, 1040 is a PC connected to a biometric node 100. It should be apparent that, in various exemplary embodiments, each of biometric nodes 1010, 1020, 1030, 1040 may exchange data and messages with all other biometric nodes via TCP/IP, Bluetooth, or any other protocol.

In various exemplary embodiments, TAS databases 1050 are a collection of one or more databases that store data implementing the functionality of anonymous association system 1000. Thus, in various exemplary embodiments, TAS databases 1050 correspond to database 1 220, database 2 230, database 3 240, and database 4 250, described in further detail above with reference to FIG. 2.

In various exemplary embodiments, institution database 1 1060 and institution database 2 1070 are databases operated by institutions. Thus, in various exemplary embodiments, databases 1060, 1070 store one or more fields of data in association with a value uniquely identifying an individual.

Although illustrated as including four nodes 1010, 1020, 1030, 1040 and two institutional databases 1060, 1070, it should be apparent that other data arrangements are contemplated. Thus, in various exemplary embodiments, anonymous association system 200 includes any number of biometric nodes or institutional databases.

Figure 11:
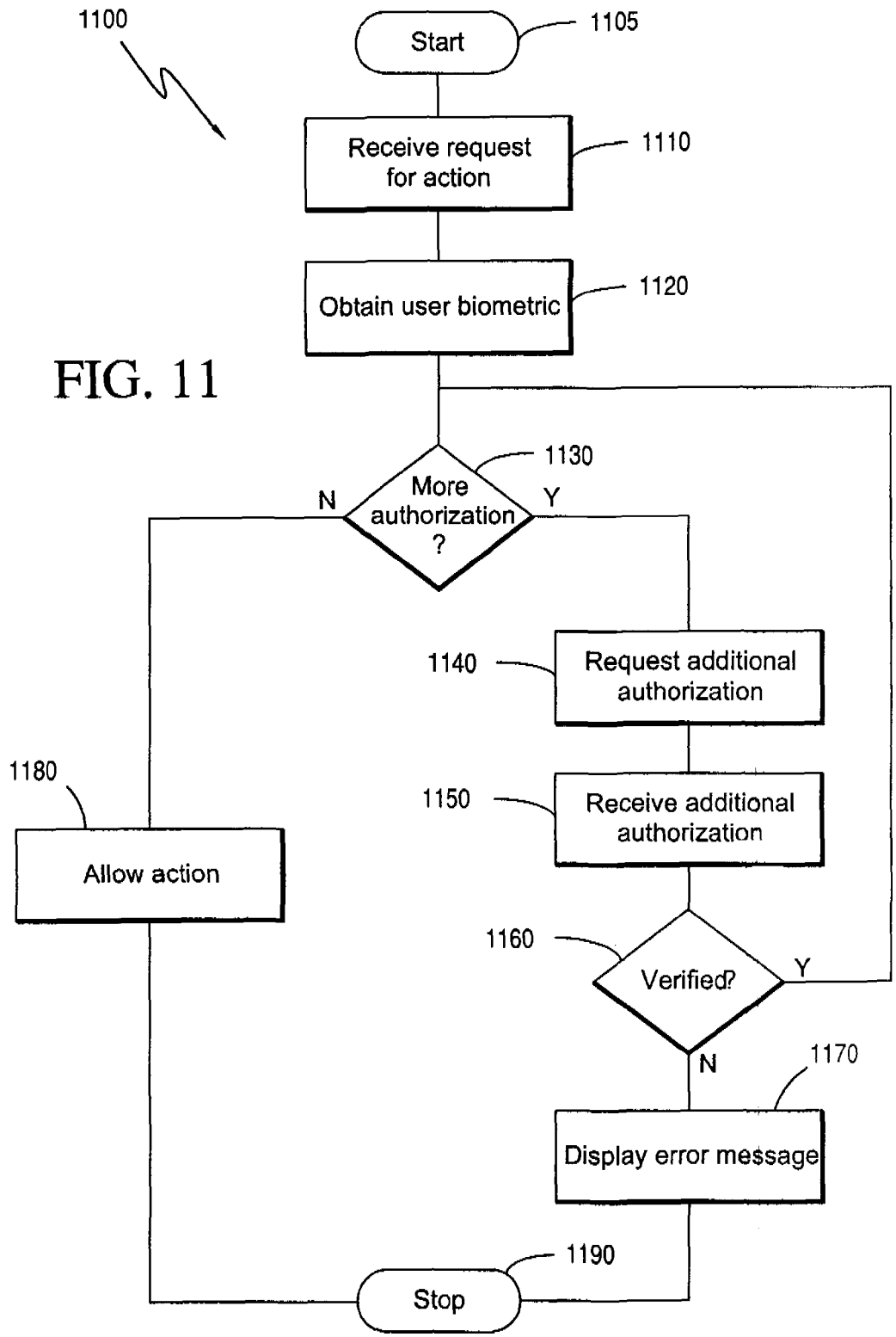
FIG. 11 is a flowchart of an exemplary embodiment of a method for performing an action requiring multiple levels of authorization.

FIG. 11 is a flowchart of an exemplary embodiment of a method 1100 for performing an action requiring multiple levels of authorization. In various exemplary embodiments, method 1100 is executed at a biometric node such as biometric node 1 1010, biometric node 2 1020, biometric node 3 1030, or biometric node 4 1040.

Exemplary method 1100 starts in step 1100 and proceeds to step 1110, where the biometric node receives a request for an action from a user. In various exemplary embodiments, the requested action is the display of aggregated data at the biometric node. Alternatively, the requested action may be any other action requiring multiple levels of authorization, including, but not limited to, conducting large financial transactions, gaining entrance to a high security area, and negotiating child custody authorization.

After receiving the request from the user, exemplary method 1100 proceeds to step 1120, where the biometric node obtains a biometric reading from the user. In various exemplary embodiments, the biometric node then queries a database, such as one of TAS databases 1050, to determine the biometric random key associated with the user.

After receiving the user biometric random key in step 1120, exemplary method 1100 proceeds to step 1130, where the biometric node or another entity determines whether additional authorization is required to allow the requested action. More particularly, in various exemplary embodiments, the biometric node sends the biometric random key to a database, such as one of TAS databases 1050, to retrieve security clearance information for the requested action. Alternatively, the security clearance information may be stored on the biometric node itself.

Based on the retrieved security clearance information, the biometric node determines whether to request additional authorization. Thus, for example, a biometric node may determine that, to allow a patient to view his or her medical records, a doctor at the hospital must first authorize the data transfer. As another example, a transfer of money over a predetermined amount may require authorization from both a bank clerk and a bank manager. As a third example, an attempt to board an airplane by a parent in custody of a child may require authorization of the other parent. As a fourth example, a transaction may be conducted in connection with an escrow asset, such that multiple parties must approve the transaction prior to allowing it to proceed.

When, in step 1130, it is determined that additional authorization is required, exemplary method 1100 proceeds to step 1140, where the biometric node requests additional authorization. More particularly, in various exemplary embodiments, the biometric node sends a message to another biometric node requesting the authorization. The other biometric node, in turn, displays the requested authorization message to its user. It should be apparent that, using this method, a biometric node may request immediate authorization from another individual, regardless of his or her physical location. Alternatively, the biometric node may display a message on its own display indicating that additional authorization is required.

In various exemplary embodiments, the additional authorization requested by the biometric node includes a biometric reading from a person other than the user. Alternatively, in various exemplary embodiments, the additional authorization requested is the insertion of a smart card or other device held by either the user or the institution.

After requesting the additional authorization from the user, exemplary method 1100 proceeds to step 1150, where the biometric node receives the requested authorization. Exemplary method 1100 then proceeds to step 1160, where the biometric node verifies the received authorization information. More particularly, in various exemplary embodiments, the biometric node determines whether the received authorization matches the authorization required by the security clearance information obtained in step 1130.

When, in step 1160, the biometric node verifies the received authorization, exemplary method 1100 returns to step 1130, where the biometric node determines whether additional authorization is required. When, in step 1160, however, it is determined that the received authorization does not match the required authorization, exemplary method 1100 proceeds to step 1170. In various exemplary embodiments, in step 1170, the biometric node displays an error message indicating that the proper authentication was not received and that the requested action cannot be performed. Exemplary method 1100 then proceeds to step 1190, where exemplary method 1100 stops.

When, in step 1130, it is determined that all required authorization has been properly obtained, exemplary method 1100 proceeds to step 1180, where the requested action is executed or allowed. More particularly, in various exemplary embodiments, the biometric node retrieves and displays the aggregated data, permits access to an area, or otherwise allows the requested action to proceed. Exemplary method 1100 then proceeds to step 1190, where exemplary method 1100 stops.

According to the forgoing, various exemplary embodiments utilize a biometric node that plays a pivotal role in the network to enable secure and non-persistent user identity aggregation from disparate sources. Through the use of such a biometric node, users may retrieve and view personal information on a single, integrated device based solely on the input of biometric data. Accordingly, in various exemplary embodiments, the biometric node is not merely a passive participant in a database scheme, but rather an active hub or node for identity aggregation and association. Furthermore, in various exemplary embodiments, the use of a network of biometric nodes allows for instantaneous multi-party authorization, without the need to obtain a password or other form of authorization.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A device for interaction with an anonymous database system, the device comprising:
    a biometric input that receives biometric data from a user;
    a communicator configured to:
        retrieve, from a first database, using the biometric data, a key generated during a first enrollment process, wherein the key is generated during the first enrollment process independently of the biometric data and stored in association with the first biometric data,
        retrieve, from a second database, using the key, an institution identifier and a user identifier stored in a second enrollment process, and
        retrieve user data from an institution database corresponding to the institution identifier; and
    a display that displays the retrieved user data.

2. The device for interaction with an anonymous database system according to claim 1, the device further comprising a card slot.

3. The device for interaction with an anonymous database system according to claim 2, wherein the card slot receives a card identifying at least one of the user data to be retrieved from the institution database.

4. The device for interaction with an anonymous database system according to claim 2, wherein the card slot receives a card indicating that the user is authorized to retrieve the user data from the institution database.

5. The device for interaction with an anonymous database system according to claim 2, wherein the card slot receives a card indicating the institution identifier.

6. The device for interaction with an anonymous database system according to claim 1, wherein the biometric input is a removable module.

7. The device for interaction with an anonymous database system according to claim 1, the device further comprising a biometric indicator that indicates a current status of the biometric input.

8. The device for interaction with an anonymous database system according to claim 1, further comprising a connection indicator that indicates a current status of a connection between the communicator and at least one central database.

9. A method of enrolling a user in an anonymous database system, the method comprising:
    performing a first enrollment process by interacting with a user, the first enrollment process comprising:
        receiving first biometric data from the user,
        generating a key independently of the first biometric data; and
        storing, in a first database, the first biometric data in association with the key; and
    performing a second enrollment process by interacting with an institution, the second enrollment process comprising:
        verifying the identity of the user at the institution,
        receiving second biometric data from the user,
        retrieving the key from the first database using the second biometric data, and
        storing, in a second database, the key, an identifier uniquely identifying the institution, and an identifier uniquely identifying the user at the institution.

10. The method of enrolling a user in an anonymous database system according to claim 9, wherein the first enrollment process further comprises receiving an alphanumeric key from the user.

11. The method of enrolling a user in an anonymous database system according to claim 9, wherein the step of verifying the identity of the user at the institution comprises at least one of verifying a photo identification, obtaining personal information, and obtaining a signature.

12. The method of enrolling a user in an anonymous database system according to claim 9, wherein the step of verifying the identity of the user at the institution comprises verifying credentials entered by the user to access a web-based account at the institution.

13. The method of enrolling a user in an anonymous database system according to claim 9, wherein the step of verifying the identity of the user at the institution is performed at a proxy institution.

14. The method of enrolling a user in an anonymous database system according to claim 9, wherein the identifier uniquely identifying the institution is embedded into a component selected from the group consisting of a chip of a biometric node located at the institution and a card inserted into a card slot of the biometric node.

15. The method of enrolling a user in an anonymous database system according to claim 9, wherein the identifier uniquely identifying the institution is manually entered by an agent of the institution.

* * * * *